J. B. WATSON.
NUT LOCK.
APPLICATION FILED DEC. 6, 1909.

959,662.

Patented May 31, 1910.

Witnesses

Inventor
John B. Watson
by his Attorneys

UNITED STATES PATENT OFFICE.

JOHN B. WATSON, OF BRADFORD, PENNSYLVANIA.

NUT-LOCK.

959,662.  Specification of Letters Patent.  Patented May 31, 1910.

Application filed December 6, 1909. Serial No. 531,607.

*To all whom it may concern:*

Be it known that I, JOHN B. WATSON, a citizen of the United States, residing at Bradford, in the county of McKean and State of Pennsylvania, have invented certain new and useful Improvements in Nut-Locks; and I do declare the following to be a full, clear, and exact description of the invention, such as will enable others skilled in the art to which it appertains to make and use the same.

This invention relates to improvements in nut locks.

One object of the invention is to provide a nut having a simple and improved construction of locking device adapted to automatically engage the bolt and prevent a retrograde movement of the nut.

Another object is to provide a locking device of this character which may be disengaged from the bolt to permit the removal of the nut.

With the foregoing and other objects in view, the invention consists of certain novel features of construction, combination and arrangement of parts, as will be more fully described and particularly pointed out in the appended claims.

Figure 1:
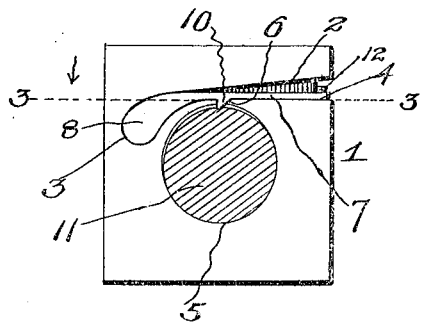
Figure 2:
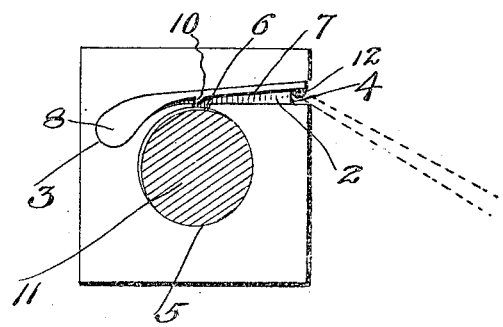
Figure 3:
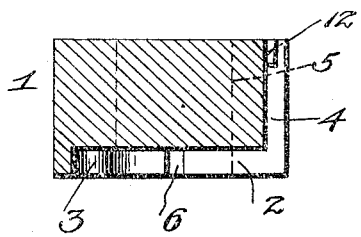
Figure 4:
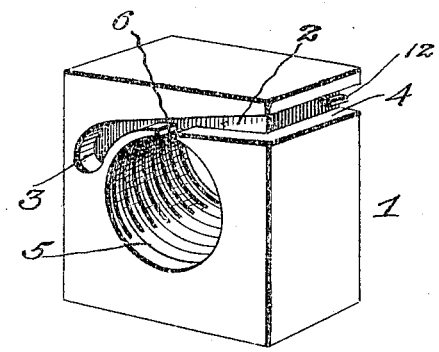
Figure 5:
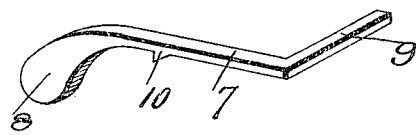

In the accompanying drawings, Figure 1 is a front view of a nut, showing the bolt in cross section and the locking device in operative engagement therewith; Fig. 2 is a similar view, showing the locking device disengaged from the bolt; Fig. 3 is a horizontal sectional view on the line 3—3 of Fig. 1, with the locking device removed; Fig. 4 is a perspective view of the nut; Fig. 5 is a similar view of the locking device.

Referring more particularly to the drawings, 1 denotes the nut, in the front or outer side of which is formed a tapered groove or channel 2, which communicates at its inner end with a downwardly curved socket or recess 3 and at its opposite end with a longitudinally disposed groove or channel 4 arranged in one side of the nut and extending across the same near one corner, as shown. The nut is provided with the usual threaded bolt hole 5 and in the outer or front side thereof is formed a notch or passage 6 which connects the groove or channel 2 with the hole 5 in the nut.

Arranged in the groove or channel 2 is a spring locking pawl 7, on one end of which is formed an enlarged head 8 which is curved downwardly and is adapted to closely fit the socket or recess 3 whereby this end of the pawl is rigidly secured in the nut. On the opposite end of the pawl 7 is formed a right angular arm 9 which lies in the channel or groove 4 of the nut. On the inner side of the pawl 7, adjacent to the head 8, is formed a bolt engaging barb or detent 10 which is adapted to work through the passage 6 and engage the threaded end of the bolt 11. The spring action of the pawl 7 forces the barb or detent 10 into engagement with the bolt with sufficient pressure to prevent the nut from becoming casually unscrewed from the bolt.

It will be noted that the barb or detent 10 is in the shape of a ratchet tooth or has one side formed at a right angle to the pawl and the other side inclined or beveled and that the detent is so arranged as to permit the beveled side of the same to play over the bolt when the nut is screwed onto the same but when the nut is turned in the reverse direction, the squared or right angular side of the detent or point thereof is brought into engagement with the side of the bolt, thus preventing a retrograde movement of the nut.

When it is desired to unscrew or remove the nut from the bolt, a chisel or other suitable tool is placed beneath the arm 9 of the pawl and the adjacent wall of the groove 4 and the pawl thus pried or sprung outwardly which will disengage or relieve the pressure of the detent 10 from the bolt 11, thus permitting the nut to be unscrewed from the bolt.

In order to more securely hold the pawl 7 down in operative position and the detent 10 in engagement with the threaded end of the bolt, I preferably provide a pawl retaining lug 12 formed in the groove or channel 4, adjacent to the end of the same, as clearly shown in Figs. 3 and 4 of the drawing. When the pawl is in operative position, the end of the same will engage between the lug 12 and the lower wall of the groove 4 and will be held by the lug against casual upward movement. The lug 12 is not of sufficient length to prevent the end of the pawl from being sprung over the same when the pawl is lifted by a suitable instrument, as hereinbefore described, and when the end of the pawl has thus been sprung over the lug, the latter will hold the same up in inoperative position and the detent out of engagement with the bolt until the pawl is again sprung down over the lug.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a device of the character described, a nut having formed therein a tapered groove or channel communicating at its inner end with a socket or recess and at its opposite end with a right angularly projecting groove, and a notch or passage between said tapered groove and the bolt hole of the nut, a spring pawl having on one end an enlarged head adapted to fit the socket or recess in the nut whereby said end of the pawl is rigidly secured, a detent formed on said pawl and adapted to work through the passage connecting said tapered groove with the bolt hole in the nut, and means whereby a tool is engaged with the outer end of said pawl to release the same and permit the nut to be unscrewed from the bolt.

2. In a nut lock, a nut having formed therein a tapered groove communicating at its smaller end with an enlarged recess or socket and at its opposite end with a right angularly formed groove in the side of said nut, and a passage connecting said tapered groove with the bolt hole of the nut, a spring pawl having on one end an enlarged head to fit the socket or recess in said nut whereby said end of the pawl is rigidly secured, a detent on said pawl, said detent having the shape of a ratchet tooth and adapted to work through the passage connecting said tapered groove with said bolt hole whereby said detent is forced into engagement with the bolt to lock the nut against retrograde movement on the bolt and to permit the same to be screwed onto the bolt, and a right-angularly formed pawl retracting arm on the outer end of said pawl adapted to engage the right angular groove in the nut.

In testimony whereof I have hereunto set my hand in presence of two subscribing witnesses.

JOHN B. WATSON.

Witnesses:
    CHAS. COVINE,
    CYNTHIA WATSON.